July 28, 1959 J. G. A. BOURGET ET AL 2,897,354

REMOTE CONTROL SYSTEM FOR A TELEVISION RECEIVER

Filed March 15, 1957 2 Sheets-Sheet 1

INVENTOR.
JOSEPH G. ANDRE BOURGET.
CHRISTIAN CARL PFITZER.
BY Alden D. Redfield
Irwin P. Garfinkle
ATTORNEYS.

July 28, 1959 J. G. A. BOURGET ET AL 2,897,354

REMOTE CONTROL SYSTEM FOR A TELEVISION RECEIVER

Filed March 15, 1957 2 Sheets-Sheet 2

INVENTORS.
JOSEPH G. ANDRE BOURGET.
CHRISTIAN CARL PFITZER
BY Alden D. Redfield
Irwin P. Garfinkle
ATTORNEYS.

United States Patent Office 2,897,354
Patented July 28, 1959

2,897,354

REMOTE CONTROL SYSTEM FOR A TELEVISION RECEIVER

Joseph G. Andre Bourget, Chicago, Ill., and Christian Carl Pfitzer, Cincinnati, Ohio, assignors to Avco Manufacturing Corporation, Cincinnati, Ohio, a corporation of Delaware Application March 15, 1957, Serial No. 646,253

6 Claims. (Cl. 250—20)

This invention relates generally to a remote control system for television receivers and, more particularly, to a wireless remote control system employing magnetic energy for controlling more than one function of the television receiver.

In most home television receivers, a turret-type, manually-operable tuner is mounted on the receiver chassis and, when it is desired to turn the receiver on or off or to change channels, it is necessary that the adjustment be made at the receiver.

A primary object of this invention is to provide a wireless device which will permit the turning on and off of a television receiver and the reliable control of the tuner from a remote control station.

A further object of this invention is to control and operate an automatic, motor-driven tuner of a television receiver and to turn off or on the power of the television receiver by means of a wireless remote control device which comprises a transmitter for generating magnetic waves and a receiver for receiving and detecting said waves.

An example of the type of motor-driven tuner apparatus with which this invention finds utility is fully described by Walter E. Foster in his application for United States patent, Serial No. 610,162, for "Servo System Adapted for Television Tuning," filed September 17, 1956, Patent No. 2,812,486, and assigned to the same assignee as this invention. The Foster device provides a tuner which is driven selectively by an electric motor, either step by step through each of the consecutive tuner positions or to certain preselected positions. The controls for the Foster type of automatic tuner are mounted at the television receiver, and operation of the tuner is controlled only at the receiver, or at a remote station connected to the receiver by wires.

It is an object of the present invention to provide a simple and reliable remote control device for an automatic tuner of the Foster type and also to provide a means for controlling the application of power to the receiver from said device.

Another object of this invention is to provide for a television receiver a new system of wireless remote control which operates outside of the radio frequency spectrum.

Another object of this invention is to provide a new system of wireless remote control which utilizes magnetic energy in the audio frequency range for controlling the operation of a motor-driven television tuner and for controlling the application of power to the television receiver chassis.

For a more comprehensive understanding of the nature and objects of this invention, reference should now be made to the following detailed description and to the accompanying drawings, in which:

Fig. 5 is a schematic circuit diagram illustrating a preferred embodiment of the receiver system in accordance with this invention.

Early investigations to produce short range control systems for television receivers suggested a number of transmission mediums. Among those considered were light beams, ultrasonic waves, radio waves, and magnetic fields. Since apparatus for generating magnetic fields is available and inexpensive, and since the difficulties due to extraneous sources and stability are readily overcome, generation by this medium presents the best method of wireless remote control for television receivers. In commercially available home television receivers, it has been found that an operating frequency in the audio frequency range between 4,500 and 6,000 cycles does not conflict with the magnetic field generated by the deflection circuits of the television receiver and, in addition, is below the frequency range regulated by the Federal Communications Commission.

Figure 1:
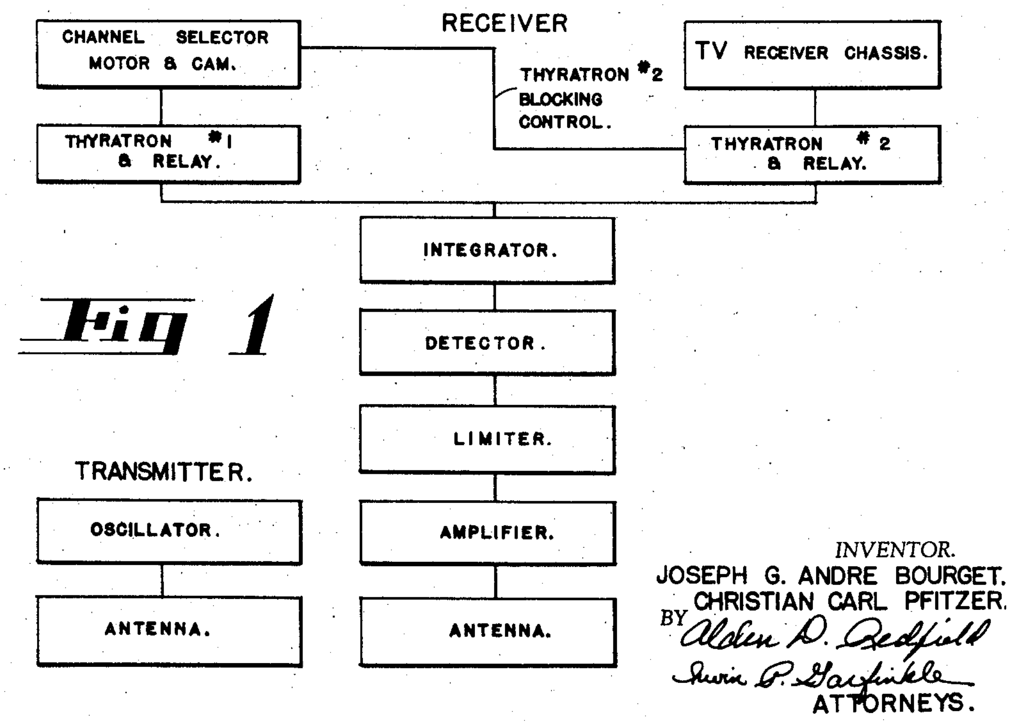
Fig. 1 is a block diagram of the preferred form of the transmitting and receiving systems used in accordance with this invention.

For the purpose of more readily understanding the organization and operation of the remote control system, discussion will first be made of the invention as disclosed in the block diagram of Fig. 1. The system consists of a remote transmitter for generating a series of pulses of magnetic energy in the audio frequency range, and a local receiver for amplifying and detecting the generated waves for the purpose of controlling a television tuner. The transmitter may be located at any convenient position in the proximity of the television receiver (in practice, from about 3 to 25 feet), while the receiver portion is mounted locally at the television receiver.

Generally, the transmitter comprises an antenna which is designed for efficiently generating a strong external magnetic field in the audio frequency range. The antenna coil is tuned to the audio frequency by a parallel-connected condenser, and the magnetic field is produced by winding the coil on a ferrite rod. The antenna is supplied with energy from an oscillator which, in the preferred embodiment, comprises a mechanically vibrating reed for opening and closing a circuit from a battery to the antenna network.

Generally, the receiver of the remote control system comprises an antenna which is resonant at the frequency of the magnetic waves generated by the transmitter. Signals received at the antenna are applied to at least one stage of amplification and, in practice, two pentode stages having a total gain of 3,600 and a 3 db band-pass of 400 cycles are employed. The amplified signals are then applied to a limiter which may consist of a biased crystal diode which is designed to limit signals to a predetermined peak. From the limiter the signal is applied to a detector which filters out the generated carrier frequencies and develops a positive signal for application to an integrator network which is used to prevent the equipment from operating on fast noise pulses such as those generated by telephone dialing and automobile ignition systems. As will be seen, the integrating network is A.C. coupled to the detector to make the unit insensitive to slow-raising interference signals of long duration, such as a television receiver warming up.

The signal from the integrating network is then applied to the two thyratrons. The first thyratron energizes a first relay for controlling the operation of a channel selector motor. The second thyratron energizes a second relay to control the application of power to the receiver; however, by means of a blocking control between the first and second thyratrons, the second thyratron can be fired to control the power circuit only at certain times and only by means of a second signal from the integrating network. Thus, the television receiver can be turned on and off, and the television channel can be changed conveniently from a position remote from the television receiver.

Figure 2:
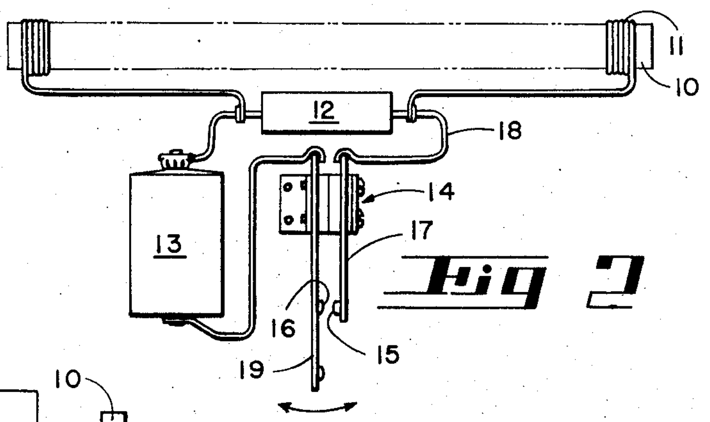
Fig. 2 illustrates a form of the transmitter system used with this invention.
Figure 3:
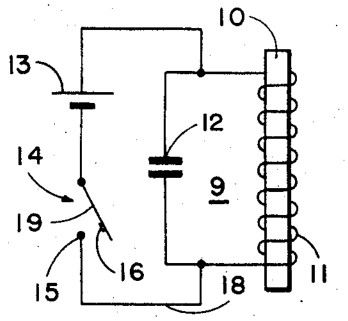
Fig. 3 is a schematic representation of the circuitry of Fig. 1.

The transmitter portion of the system illustrated in Figs. 2 and 3 is disclosed and claimed by Joseph G. Andre Bourget in the co-pending application for Letters Patent entitled "Magnetic Energy Transmitter for a Remote Control System for a Television Receiver," Serial Number 646,396, filed on March 15, 1957, and having the same inventors as this application and assigned to the same assignee as this invention. The transmitter comprises a resonant tank 9 consisting of a ferrite rod 10 on which is wound a coil 11 tuned to the desired operating frequency by means of a condenser 12. The resonant tank 9 is energized from a D.C. voltage supply which may consist of an ordinary flashlight cell 13 connected in series with a reed-type switch 14. The switch 14 includes a pair of contacts 15 and 16 which are adapted to open and close the circuit from the battery to the resonant tank 9. The contact 15 is fixedly mounted on a rigid conductor 17 which is connected by a lead 18 to one end of coil 11 and the condenser 12, while the contact 16 is mounted on a conductive, metallic reed 19 which may be mechanically vibrated by appropriate means (not shown), so that the circuit between the battery 13 and the resonant tank 9 is alternately opened and closed.

Figure 4:
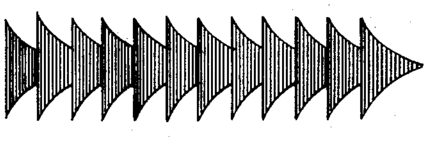
Fig. 4 represents the wave form generated by the transmitter illustrated in Figs. 1 and 2.

When the contacts 15 and 16 are closed, the battery voltage is impressed across the coil 11 to produce a magnetic field; when opened, the magnetic field collapses, and the tuned circuit comprising the coil 11 and condenser 12 produces a series of damped oscillations. The wave form of the magnetic energy produced for transmission from the tank 9 is illustrated in Fig. 4. In practice, the reed is designed to vibrate sufficiently to cause about twelve closings and openings of the contacts 15 and 16.

The circuit illustrated in Figs. 2 and 3 must have a high Q in order to efficiently radiate magnetic energy. Factors which contribute to a high Q are a concentration of the windings in the center of the core, close contact between the wires and the core, a low L/C ratio, and a high permeability, low-loss core. On the other hand, external field strength along the axis of the coil is directly related to the total flux in the core, and thus to the cross section area and length of the coil, as well as to the turns-amperes in the coil when the contacts 15 and 16 are closed. Thus, a compromise must be made between the Q of the coil and the winding length and diameter. By extending the coil 11 over the entire length of the ferrite core 10, a maximum external magnetic field is provided and the Q of the coil 11 has been found to be sufficiently high for efficient operation.

Figures 6, 7:
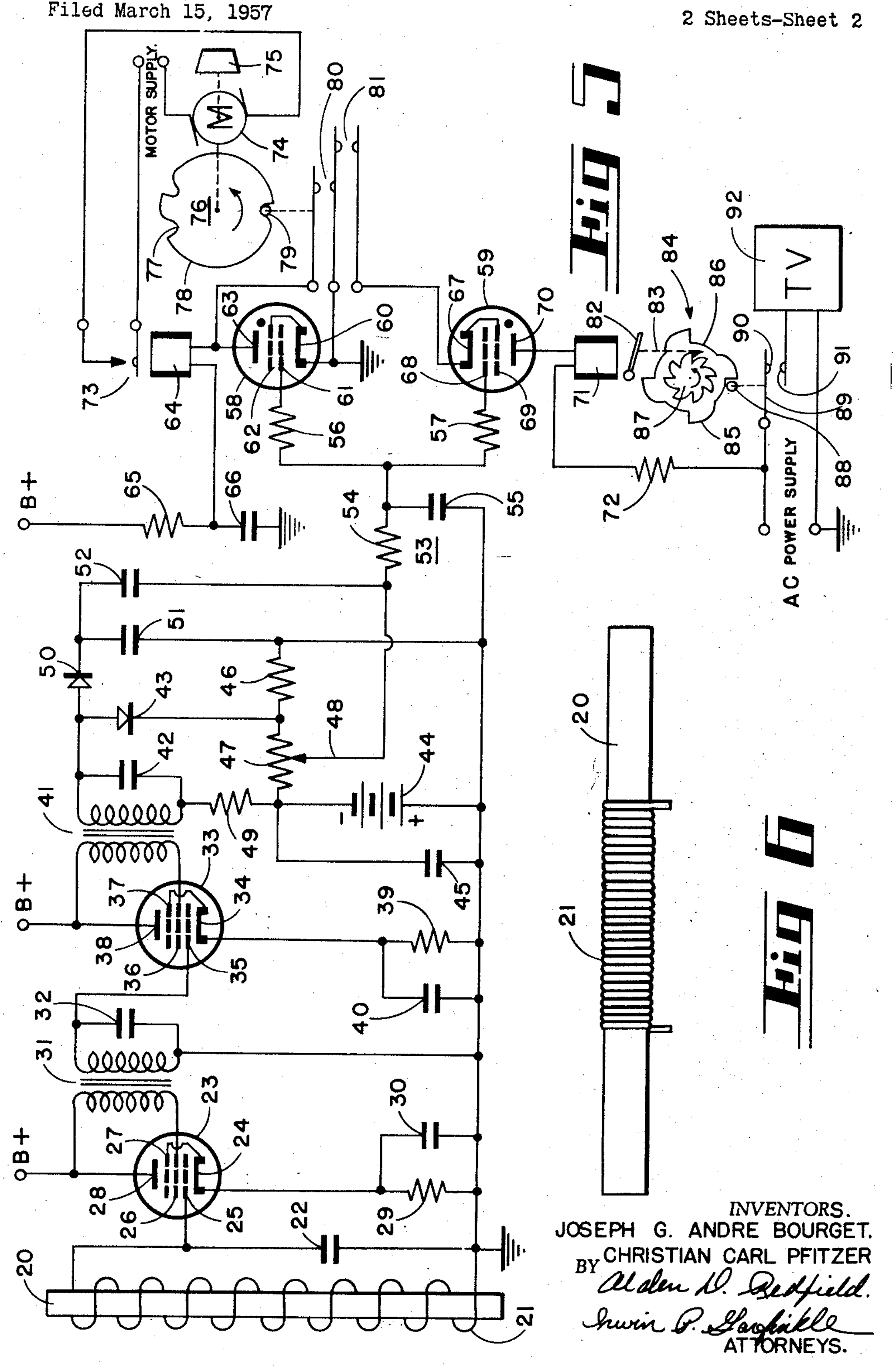
Fig. 6 is a preferred form of the antenna employed in the receiving portion of the system.

Reference should now be made to the receiver portion of the system which is shown in detail in Fig. 5. The receiver antenna is very similar to that used in the transmitter, and it comprises a ferrite core 20 on which is wound a coil 21 tuned to the transmitter frequency by condenser 22. However, since the receiving antenna is not designed to produce maximum external magnetic fields, a higher Q coil is achieved by concentrating the windings of the coil 21 in the middle of the core 20, as illustrated in Fig. 6.

In a practical form of the invention, two stages of amplification, each of which includes a pentode vacuum tube, are provided for the signals received at the coil 21. Depending on the requirements of the system, however, any number of amplifier stages may be employed, and different types of tubes or transistors may be substituted without departure from the spirit of the invention. The first stage of amplification consists of a pentode 23 provided with a cathode 24, a control grid 25, a screen grid 26, a suppressor grid 27 and a plate 28. Signals at the coil 21 are applied between the control grid 25 and the cathode 24 through a cathode resistor 29 and an A.C. bypass condenser 30. The suppresser grid 27 is connected in a conventional manner to the cathode 24. An A.C. load comprising a transformer 31 tuned to the transmitted frequency by means of a condenser 32 is connected between the screen grid 26 and the plate 28, which is supplied with operating direct current bias from a B+ supply.

The output from the tuned transformer 31 is then applied to the second stage of amplification, which comprises a second pentode 33 having a cathode 34, a control grid 35, a screen grid 36, a suppressor grid 37 and a plate 38. The output from the transformer 31 is coupled between the control grid 35 and the cathode 34 through a cathode resistor 39 and an A.C. by-pass condenser 40. The suppressor grid 37 is coupled in a conventional manner to the cathode. The A.C. load of the pentode comprises a transformer 41 tuned to the transmitted frequency by a condenser 42 and is connected between the screen grid 36 and the plate 38, which is operatively biased from the B+ supply.

The output from the transformer 41 is then applied to two diodes for limiting and detecting. The first diode comprises a crystal diode rectifier 43 which is provided for the purpose of limiting the signals from the secondary of transformer 41 to a predetermined peak. The diode 43 is biased from a biasing network which includes a battery 44 or other source of D.C. biasing potential. The battery 44 is A.C. by-passed by a condenser 45 and is connected across a voltage-dividing network comprising a fixed resistor 46 and a resistor 47 having a variable tap 48. The negative side of the diode 43 is connected to the negative side of the battery 44 through the secondary of transformer 41 and a resistor 49, while the positive side of the diode is connected to the junction of resistors 46 and 47. The output from limiting diode 43 is then applied to the crystal diode 50 which constitutes a peak detector; i.e., the diode 50 reads the maximum level of the positive envelope of the limited signal from the diode 43, and the carrier frequency is filtered to ground through an A.C. by-pass condenser 51. The detected signal is then applied through condenser 52 to an integrating network 53 which comprises a resistor 54 and a condenser 55. The integrating network prevents the receiver from operating on fast noise pulses, such as those generated by telephone dialing or by the ignition system of an automobile and, since the integrator 53 is A.C. coupled to the peak detector 50 through the condenser 52, it is also made insensitive to slow-raising interference signals of long duration, such as a television receiver warming up.

The output from the integrator is then coupled through resistors 56 and 57 to the input circuit of two thyratrons 58 and 59 to provide the bias necessary to fire the thyratrons upon the receipt of transmitted pulses of magnetic energy from the remote transmitter. The thyratron 58 is a tetrode having grounded cathode 60, a control grid 61 coupled to the output of the integrator 53 by means of the resistor 56, a screen grid 62 directly coupled to the cathode, and a plate 63 supplied with operating direct voltage potential from the B+ supply through a relay winding 64 and a resistor 65 which is A.C. bypassed by condenser 66. The thyratron 59 comprises a cathode 67, a grid 68 coupled to the output of the integrator 53 through the resistor 57, a screen grid 69 directly connected to the cathode, and a plate 70 supplied with an alternating voltage potential through a relay winding 71 and a resistor 72. For the purpose of adjusting the sensitivity of each thyratron, a source of adjustable D.C. biasing potential is applied to the control grids 61 and 68 from the variable tap 48 and through the resistors 54 and 56. In this way, the amount of biasing signal which must be developed at the integrator 53 to fire the thyratron may be varied by adjusting the position of the tap 48.

The thyratron 58 is provided with operating plate bias from the B+ supply which is sufficient to cause conduction of the tube when a proper signal is applied from the integrator 53 to the control grid 61. Conduction of thyratron 58 energizes the relay 64 to close the relay contacts 73 which are operatively associated therewith, and thus completes a circuit from the motor supply voltage to an electric motor 74. The motor 74 is mechanically coupled to the tuner 75 of the television receiver and to a station selector cam 76 having depressed portions 77, each of which represents a selected station or tuner position, and elevated portions 78. Associated with the station selector cam 76 is a cam follower 79 which is adapted to ride on the periphery of the cam 76 and which is operatively associated with the two pairs of contacts 80 and 81. When the cam follower 79 is in a depressed portion 77 (i.e., the tuner is positioned on station), the contacts 80 and 81 will be separated, as illustrated. When the cam follower 79 is riding on an elevated portion 78, then the contacts 80 and 81 will be closed.

Although bias potential is applied to the grid 61 in an amount sufficient to fire the thyratron 58, the equivalent potential applied to the grid 68 has no effect on the thyratron 59 when the contacts 81 are open, since the circuit from the A.C. supply through the thyratron 59 is not complete. However, once the thyratron 58 is fired, the station selector cam 76 is rotated and the cam follower 79 is forced on to an elevated portion 78 of the cam, thus closing the contacts 80 and 81. When the contact 80 is closed, the plate 63 of the thyratron 58 is short-circuited to ground, and conduction in thyratron 58 ceases; however, the relay 64 is maintained energized from the B+ supply through the contacts 80 to ground, thereby continuing the energization of the motor 74 and the rotation of the cam 76 until the cam follower 79 falls into a subsequent depressed portion 77.

During the entire period while the cam follower 79 is riding on an elevated portion, the contacts 81 are closed and, therefore, the A.C. supply will be connected in circuit with the plate 70 and the cathode 67 of the second thyratron 59. In the event that a second series of pulses is received at the antenna coil 21 and applied from the integrator 53 to the control grid 68 during this period, then thyratron 59 will be biased by the voltage on grid 61 to cause conduction during a major portion of the positive half-cycle of the A.C. supply, and the relay 71 will be energized momentarily.

Associated with the relay 71 is an armature 82 which normally may be spring-biased away from the relay windings. A ratchet member 87 is fixedly mounted in any convenient manner on a power on-off cam 84 which is provided with elevated surfaces 85 and depressed surfaces 86. A pawl 83 is mechanically coupled to the armature 82 and is in engagement with the ratchet 87. A cam follower 88 is mounted on a contact carrier arm 89 and is adapted to ride upon the cam surfaces 85 and 86. A contact 90 is mounted on the lever 89 in operative association with a fixed contact 91. When the relay 71 is energized, the armature 82 is attracted toward the relay, thus causing the rotation of the cam 84 as a result of the coaction between the ratchet 87 and the pawl 83. In the arrangement shown, the cam will be rotated ⅛ revolution and the cam follower 88 will ride on to a depressed surface 86, thereby opening the contacts 90 and 91 and thus opening the power from the A.C. supply to the television receiver 92. In like maner the set may be turned on by transmitting two consecutive series of pulses.

By means of this invention, therefore, there has been provided a remote control system which is capable of controlling two functions of a television receiver from a single transmitter control device. By transmitting a single series of pulses of magnetic energy, the channel of the television receiver may be changed; by transmitting two consecutive series of pulses of magnetic energy, the receiver may be turned on or off.

What is claimed as our invention is:

1. In a system for controlling the power circuit of a television chassis and for controlling the operation of the tuner of said television which is driven by an electric motor, the combination comprising: a first switch connected in said power circuit; a second switch connected in circuit with said motor and a source of energization for said motor; a first relay for operating said first switch; a second relay for operating said second switch, said second relay being connected in circuit with an electronic valve and a direct voltage source; said first relay being connected in circuit with a second electronic valve, a third switch which is normally open and a source of alternating current potential, the contacts of said third switch being connected in parallel with said first electronic valve; and a cam mechanically coupled to said motor and to said third switch for closing said switch when said motor is operating.

2. The invention as defined in claim 1, wherein said first and second electronic valves each comprise: a gas-filled tube having a control grid, a cathode and a plate, and wherein each of said valves is controlled by the application of a control signal to said control grids.

3. In a system for controlling the application of power to the chassis of a television and for controlling the operation of the tuner of said television, said tuner being driven by an electric motor, the combination comprising: a generator remote from said television for generating pulses of magnetic energy in the audio frequency range; a receiver mounted on said television chassis for receiving, amplifying and detecting said pulses of magnetic energy; a first switching system for controlling the operation of said motor; a second switching system for controlling the application of power to said television chassis; a first electronic valve for controlling said first switching system; a second electronic valve for controlling said second switching system, said second electronic valve being normally conditioned for non-conduction; means for simultaneously coupling said detected pulses of magnetic energy to said first electronic valve and to said second electronic value to render said first electronic valve conductive to operate said first switching system to energize said motor; and means associated with said motor and said first switching system for de-energizing said motor after a predetermined interval and for conditioning said second electronic valve for conduction, whereby a second series of detected pulses coupled to said electronic valves will render said second electronic valve conductive to control the application of power to said chassis.

4. The invention as defined in claim 3, wherein said electronic valves are electron tubes, each having a plate, a cathode and a grid, and wherein said coupling means to said electronic valves is an integrating network comprising a resistor in series with said grid and a condenser in parallel with said grid.

5. The invention as defined in claim 4, wherein said electron tubes are thyratrons.

6. The invention as defined in claim 3, wherein each of said first and second switching systems includes a cam.

References Cited in the file of this patent

UNITED STATES PATENTS 2,297,618 Grimes et al. ---------- Sept. 29, 1942
2,483,620 Burlingame et al. -------- Oct. 4, 1949
2,805,379 Troeller ---------------- Sept. 3, 1957